United States Patent [19]

Reimert

[11] Patent Number: 5,094,270
[45] Date of Patent: Mar. 10, 1992

[54] DOUBLE GATED VALVE

[75] Inventor: Larry E. Reimert, Spring, Tex.

[73] Assignee: Dril-Quip Inc., Houston, Tex.

[21] Appl. No.: 669,525

[22] Filed: Mar. 14, 1991

[51] Int. Cl.$^5$ .............................................. F16K 3/00
[52] U.S. Cl. ............................ 137/614.11; 137/614.21; 251/328
[58] Field of Search ............... 137/614.11, 614.19, 137/614.21; 251/210, 328

[56] References Cited

U.S. PATENT DOCUMENTS

| | | |
|---|---|---|
| 759,448 | 5/1904 | Kiser. |
| 2,749,940 | 3/1952 | Bronson, II. |
| 3,003,742 | 10/1961 | Kearns. |
| 4,193,574 | 3/1980 | Barnes et al.. |
| 4,275,763 | 6/1981 | Fahrig. |
| 4,294,284 | 10/1981 | Herd. |
| 4,499,919 | 2/1985 | Forester. |
| 4,524,796 | 6/1985 | Ayers, Jr. et al.. |
| 4,645,179 | 2/1987 | Ali ............................. 251/328 X |
| 4,824,074 | 4/1989 | Baugh .......................... 251/328 X |

Primary Examiner—John C. Fox
Attorney, Agent, or Firm—Vaden, Eickenroht Thompson & Boulware

[57] ABSTRACT

There is disclosed a gate valve having a pair of side-by-side through conduit gates which are adapted to be reciprocated relatively to one another by a fail safe actuator of such construction as to move the upstream gate to closed position before the downstream gate and the downstream gate to open position before the upstream gate.

11 Claims, 5 Drawing Sheets

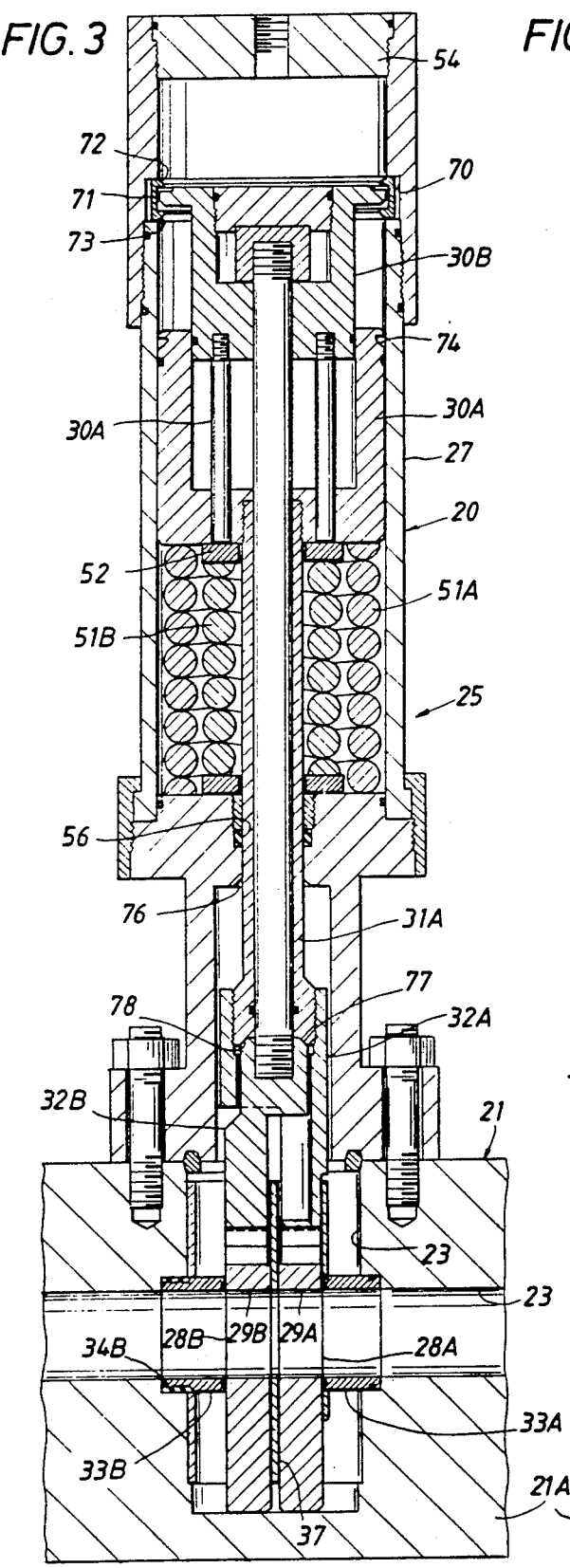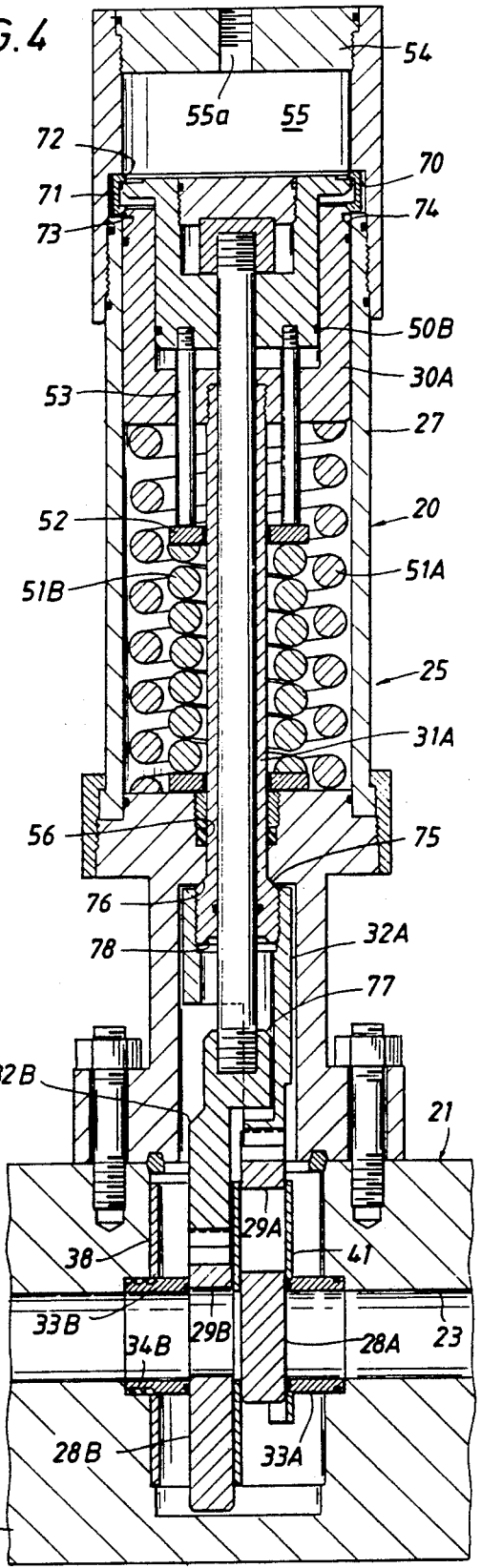

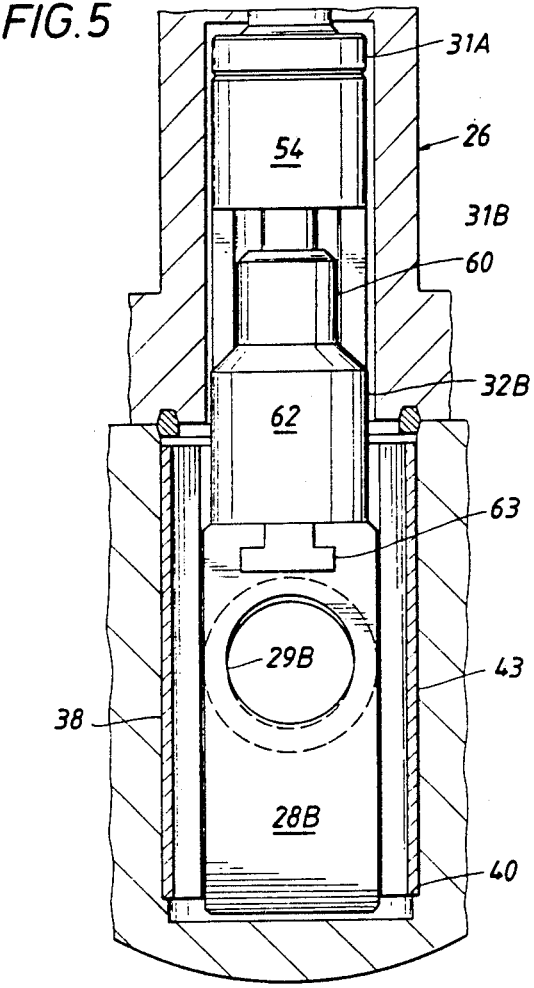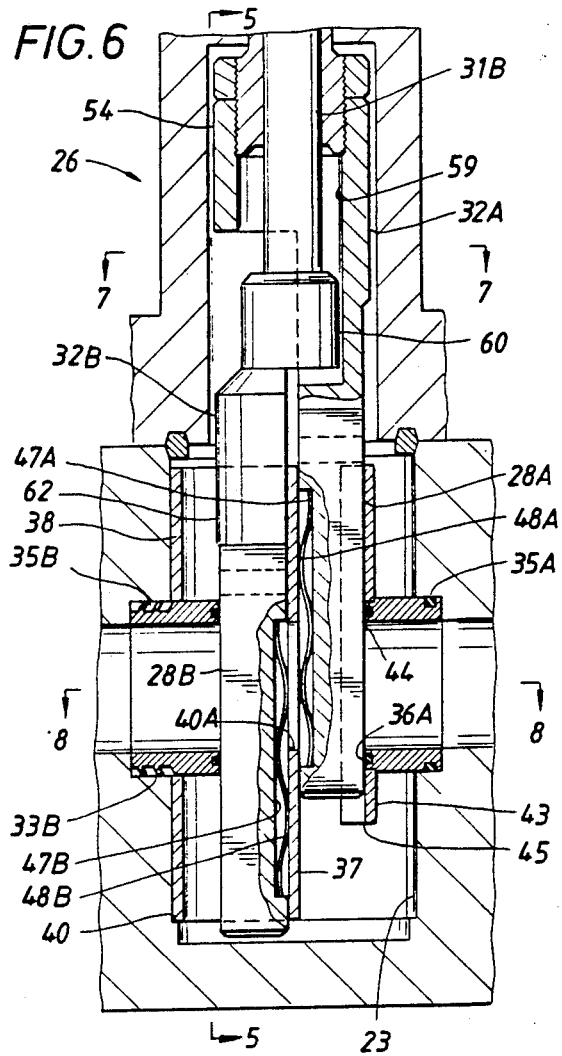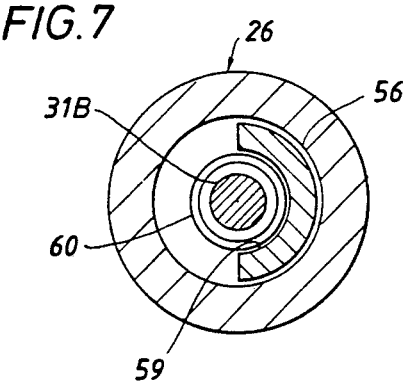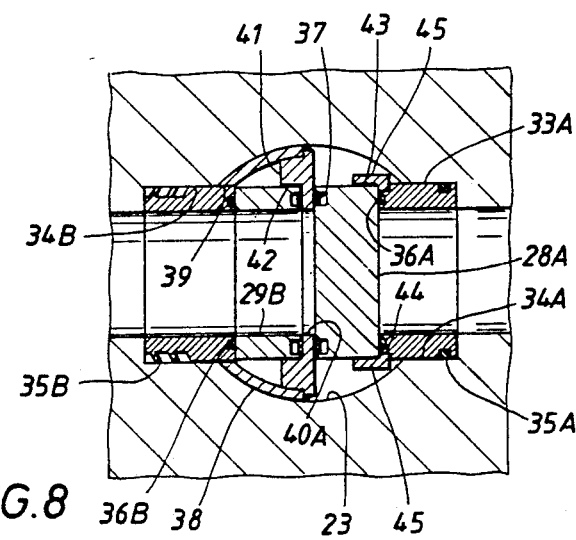

DOUBLE GATED VALVE

This invention relates to improvements in gate valves, and, in particular, to gate valves of the through conduit type. In one of its aspects, it relates to such gate valves which are also of the fail safe type.

The greatest wear on both the gate and the valve body of a through conduit gate valve occurs at end of its closing movement and beginning of its opening movement. Thus, at this stage of the valve operation, line fluid is caused to flow at high velocity through a very small opening between the port in the gate and the end opening of the flowway in the valve body on the downstream side of the gate.

Because of this problem, redundant gate valves are sometimes installed in the flow line being controlled, the upstream valve being "sacrificial" in the sense that it is adapted to be opened first and closed last so as to absorb substantially all of the wear. Even when the upstream valve first wears to the point it no longer seals, the downstream valve takes over the sealing function without significant wear, at least until wear on the upstream valve becomes so severe as to permit leakage of line fluid therepast at high rates. Consequently, the arrangement normally permits the useful life of the valves to be greater than would be expected of the combined lives of each individually.

This redundant arrangement of gate valves is especially useful in remote locations where a single valve would be difficult to reach for replacement and/or repair. This is true, for example, in the case of valves installed on subsea wellheads a substantial distance below the water surface. As well known in the art, valves used at these installations are often fail safe—i.e., adapted to either open or close automatically in response to a given condition at a location remote from the wellhead.

The use of redundant valve, each having its own valve body and actuator, is of course quite expensive. Also, they require considerable space in and around the flow line being controlled, which space may be at a premium. It is therefore a primary object of this invention to provide a through conduit type gate valve capable of performing the function of the redundant valves above described, but having only a single valve body and actuator.

A more particular object is to provide such a valve in which a pair of through conduit gates mounted in side by side relation within the valve body are moved between opened and closed positions by an actuator which is so constructed and arranged as to automatically sequence their movement in such a manner that the upstream gate performs the function of an upstream or sacrificial valve.

A further object is to provide such a valve in which the actuator causes the gates to move to one of their positions automatically in response to a failed condition.

Yet another object is to provide such a valve in which the actuator is of compact construction.

These and other objects are accomplished, in accordance with the illustrated embodiment of the invention, by a gate valve of the type described having first and second gates of the through conduit type mounted within the cavity of a single valve body for movement in side by side relation between opened and closed position, and an actuator for so moving the gates which includes means for moving the first gate from closed to open position only after the second gate has been so moved and for moving the second gate from open to closed position only after the first gate has been so moved. Thus, with the first gate on the upstream side of the valve body, the gates are automatically moved in such sequence as to duplicate the function of redundant valves connected in series in a flow line.

In accordance with the preferred embodiment of the invention, the actuator comprises a cylinder and first and second pistons reciprocal within the cylinder and connected to the first and second gates, respectively, for moving each of them to one of its positions in response to the supply of fluid under pressure to the cylinder. More particularly, the actuator further includes first and second springs urging each of the first and second gates, respectively, to its other position, and means holding the first piston against movement in a direction to move the first gate from closed to open position until the second gate has been moved in a direction to move the second gate from closed to open position, and holding the second piston against movement in the direction to move the second gate from open to closed position until the first piston has been moved in a direction to move the first gate from open to closed position. Thus, as also described above, the valve is of the fail safe type in which both of the gates are caused to move to one of its positions, normally closed, in response to the loss of fluid pressure in the cylinder, which loss may occur in response to a predetermined condition remote from the valve itself.

As illustrated, the pistons and springs are arranged concentrically of one another, and the pistons are connected to their respective gates by concentric rods which extend sealably from the cylinder into the valve body, thus, providing the actuator with a very compact construction. More particularly, the first piston is sealably slidable within the cylinder and the second piston is sealably slidable within the first piston, and the means for holding the pistons includes an expandable and contractible locking ring mounted in the cylinder to hold the first piston, as the second piston moves in a closing direction, and engageable by the second piston to release the first piston as the second piston reaches the end of its closing movement, and to hold the second piston as the first piston moves in an opening direction and engageable by the first piston to release the second piston as the first piston reaches the end of its opening movement.

As illustrated, the valve further includes first and second seat rings which are sealably slidable in the valve body for engaging the outer sides of the first and second gates, respectively, and the gates are connected to their stems for relative movement with respect thereto in the direction of the flowway. More particularly, the end of the first seat ring and outer side of the first gate are yieldably urged against one another, so that upstream line fluid maintains the upstream seat in sealing engagement with the upstream gate.

A means is mounted in the valve body for guiding the gates as they move between open and closed positions, including a guide frame having an inner wall extending between the gates and having a port therethrough adapted to be aligned with the ports in the gates, and an outer wall closely surrounding the second seat ring and bearing against the body cavity on the outer side of the second gate. Thus, the load on the first gate due to line pressure on the upstream side thereof is transmitted directly to the valve body so as to facilitate free movement of the gates which otherwise might bind due to force of line fluid.

As illustrated, the gate guiding means also includes a guide plate which closely surrounds and is supported by the first seat ring and has flanges which extend along the side edges of the first gate. More particularly, the inner wall of the guide frame and the guide plate are arranged to cover the port in the first gate as it moves into and out of closed position and thus prevent the passage of debris into the valve body cavity.

In the preferred embodiment, springs are compressed between the outer sides of the inner wall and the inner sides of the gates to urge the gates apart and thus force the front and second gates outwardly against the ends of their respective seat rings.

In the drawings wherein like reference characters are used throughout to designate like parts:

FIG. 3 is a view similar to FIG. 2, but upon release of the second gate for movement to a open position;

FIG. 4 is still another view similar to FIG. 3, but upon movement of the second or upstream gate to closed position, but prior to release of the first or downstream gate for movement to the closed position on FIG. 1;

FIG. 5 is a vertical sectional view of the valve, as seen along broken lines 5—5 of FIG. 6, and showing the downstream gate and its connection to a second piston in the open position shown in FIG. 2;

FIG. 6 is a view of the valve partly in section and partly in elevation, with the gates in the positions shown in FIG. 2;

FIG. 7 is a cross-sectional view of the valve, as seen along broken lines 7—7 of FIG. 6;

FIG. 8 is a horizontal sectional view of the valve, as seen along broken lines 8—8 of FIG. 6;

Figure 1:
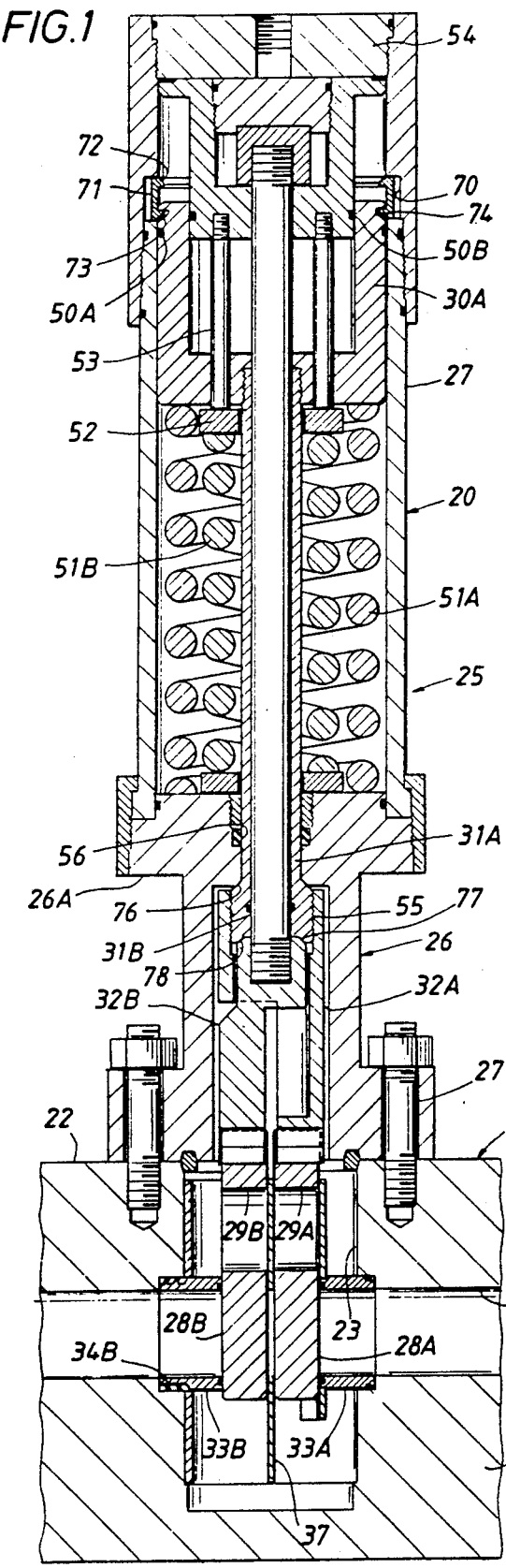
FIG. 1 is a vertical, sectional view of a valve constructed in accordance with the present invention and showing the valve closed to the flow of line fluid in a direction from the right to the left.

With reference now to the details of the drawings, the above described valve, which is indicated in its entirety by reference character 20, comprises a valve body 21 including a main portion 21A having a flowway 22 therethrough adapted to be connected in a flow line and a cavity 23 intersecting the flowway intermediate its ends. The valve body also includes a bonnet 26 bolted at 27 to the upper side of the main body with its open lower end forming an upward continuation of the upper end of the cavity and a top wall 26A at its upper end closing the upper body of the cavity 23. As shown in FIGS. 7 and 8, both the interior of the bonnet and cavity are of cylindrical shape.

The valve further comprises a pair of gates 28A and 28B mounted in side by side relation within the valve body for relative reciprocation between positions opening and closing the flowway. As shown, gate 28A has a port 25A therethrough and gate 28B has a port 29B therethrough, each of the ports being of the same size as the flowway and located above a solid portion of the gate.

Figure 2:
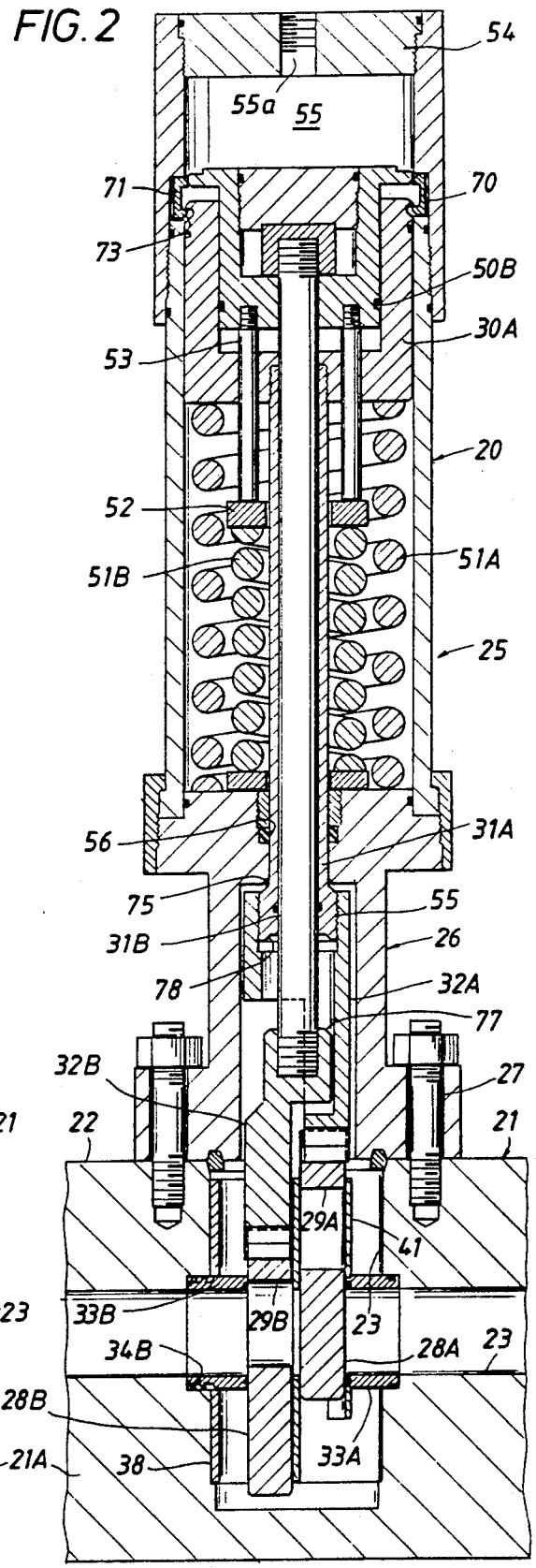
FIG. 2 is a view similar to FIG. 1, but upon movement of the a first or upstream gate toward open position but prior to release of the second or downstream gate for movement to open position.

With flow through the valve in a direction from right to left, as shown in FIGS. 1 to 4, the gate 28A is the upstream gate and the gate 28B is the downstream gate. The valve is closed when the solid portion of one or more of the gates is over the flowway 23 as shown in FIGS. 1, 2 and 4. The valve is open when both of the ports are aligned with one another and the flowway, as shown in FIG. 3.

The valve also includes an actuator 25 having a cylinder 27 connected to and extending upwardly from the top wall 26A of the bonnet, a piston 30A sealably slidable within the cylinder 27 and connected to the upstream gate 28A by means of a stem 31A extending sealably through the top wall 26A of the bonnet of the valve body, and a piston 30B sealably slidable within the piston 30 and connected to the downstream gate 28B by means of a stem 31B which extends sealably through the stem 31A. More particularly, the lower end of stem 31A is releasably connected to the upper end of gate 28A by means of a connector 32A, and the lower end of the stem 31B is releasably connected to the upper end of the downstream gate 28B by means of a connector 32B.

As will be described in connection with the detailed construction of the actuator, the piston 30B may be moved downwardly from the position of FIG. 1 to the position of FIG. 2 to lower the gate 28B and thus move its port into substantial alignment with the downstream end of the flowway. However, at this stage, the piston 31A and gate 28A are still in their upper positions so that the solid portion of the gate is aligned with the flowway to maintain the valve closed.

As shown in FIG. 3, the piston 30B has been lowered still further to move the gate 28B to its lowermost position fully aligned with the downstream end of the flowway, and the piston 31B has been lowered to in turn lower gate 28A to its lowermost position in which its port is aligned with the upstream end of flowway 23 and the port in gate 28B, whereby the valve itself is open.

During the closing phase of the valve, piston 30A is first raised to in turn raise the gate 28A toward its uppermost position of FIG. 2 in which its solid portion covers the port in gate 28B. Upon further upward movement of piston 30A to its uppermost position, as shown in FIG. 1, piston 30B is released in order to raise gate 28B to a position in which its port is aligned with the port in gate 28A and the flowway, whereby the valve itself is closed.

A pair of seat rings 33A and 33B are mounted within recesses 34A and 34B, respectively, in the flowway of the valve body at its intersection with the cavity 23 on the upstream and downstream sides thereof. More particularly, and as best shown in FIGS. 6 and 8, the seat ring 33A carries a seal ring 35A about its outer diameter which is sealably slidable within the recess 34A and another seal ring 36A on its inner end which is engageable with the upstream side of the gate 28A. Thus, with the inner end of the seat ring 33A and outer side of the upstream gate yieldably urged into engagement with one another, as will be described to follow, upstream line pressure in the valve is effective to maintain the seat sealably engaged with the upstream gate.

The downstream seat ring 33B, on the other hand, has flexible lips 35B formed thereabout for sealably engaging the recess 34B in metal-to-metal sealing relation. Also, a seal ring 36B is carried within its inner end so as to seal against gate 28B when the seat ring and the inner end of the seat are yieldably urged against one another. The lips 35A face inwardly so as to seal against flow from within the cavity into the flowway of the downstream side of the downstream gate.

The downstream gate 28B is guidably movable within the valve body by means of a D-shaped guide frame having an inner wall 37 which is disposed between the inner sides of the gates and an outer curved wall 38 which is received closely within the cavity 23 of the main valve body portion on the downstream side of the downstream gate and which has an opening 39 therein closely surrounding the downstream seat ring 33B. The lower end of the guide frame is supported on a ledge 40 in the body cavity and, due to its semi-circular shape, is prevented from moving out of the left-hand side of the body cavity, as shown in FIG. 8.

The inner wall 37 of the guide frame has a port 40A therethrough aligned with the port in gate 28B, and a flange 41 on its opposite side edges which provides a guide surface 42 in which the side edges of the downstream gate are slidable, as best shown in FIG. 8. Thus, gate 28B is guided during its reciprocation between open and closed positions by means of the inner end of the downstream seat ring 33B as well as the inner wall 37 of the guide frame.

The upstream gate 28A, on the other hand, is guidably reciprocable between the opposite side of the inner wall 37 of the guide frame and a guide plate 43 which closely surrounds and is supported by the inner end of the seat ring 33A on the upstream side of the upstream gate. Thus, as best shown in FIG. 6, the guide plate 43 has an opening 44 therein which fits closely within a notch about the inner end of the upstream seat ring and flanges 45 on its opposite sides which are close to the opposite side edges of the upstream gate so as to guide it against lateral movement within the cavity, as best shown in FIG. 8.

In addition to guiding the gates during their reciprocation between open and closed positions, the guide frame and guide plate serve to prevent debris in the line fluid from entering the cavity as the upstream gate moves between opened and closed positions. Thus, as will be understood from FIGS. 1-4, the port through upstream gate 28A is disposed between the inner wall of the guide frame and the guide plate as it moves between its opened and closed position. At the same time, the downstream end of the port in the downstream gate 28B is covered by the opposite side of the inner wall of the guide frame as the downstream gate moves between open and closed positions, and, in any event, the port in the downstream gate moves across the flowway only when the upstream gate is in closed position.

Figure 9:
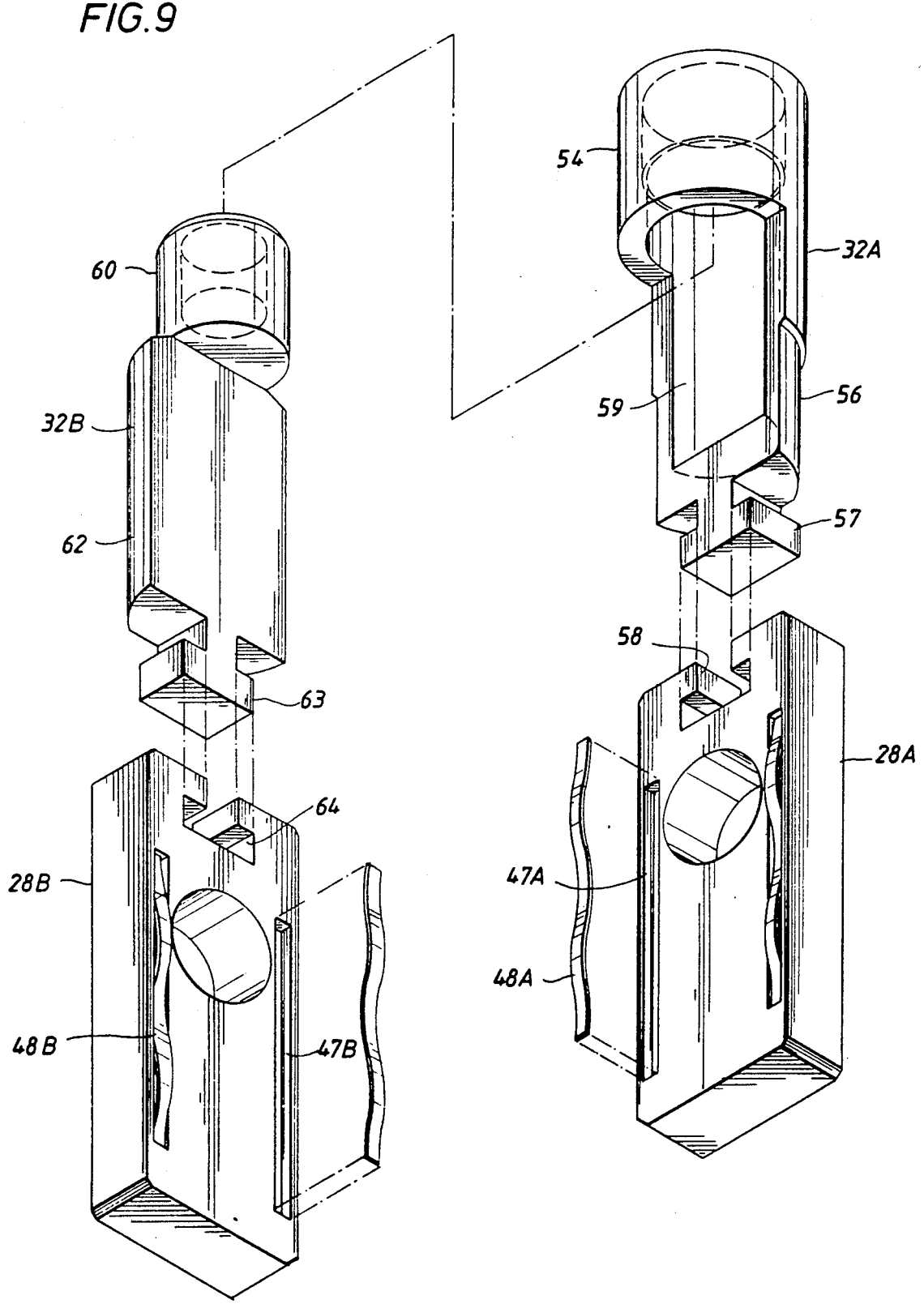
FIG. 9 is an exploded perspective view of the gates and their connections to the lower ends of rods extending from the pistons of the actuator.

As shown in FIG. 9, the inner faces of the upstream and downstream gates are provided with slots 47A and 47B, respectively, on opposite sides of the ports therethrough and near their opposite side edges. More particularly, slots 47A are adapted to receive wavy springs 48A of such configuration as to protrude from the slot, when unstressed, so as to engage the opposite sides of the inner wall 37 of the guide frame, thus maintaining the end of the upstream seat ring and upstream gate engaged with one another, as previously described. Similar wavy springs 48B received in the slots 47B are of such configuration as to protrude therefrom and thus urge the downstream gate against the inner end of the downstream seat ring and thus the outer end of the seat ring against the outer end of its recess.

The piston 30A connected to the upstream gate carries a seal ring 50 thereabout sealably slidable within the cylinder of the actuator, whereby it is urged downwardly in response to the supply of fluid under pressure to the cylinder above it, as will be described. Piston 30A is urged upwardly to in turn raise the upstream gate by means of a coil spring 51A compressed between the lower side of piston 30A and the top wall 26A of the bonnet. The piston 30B connected to the downstream gate carries a seal ring 50B thereabout for sealably sliding within the upper end of the piston 30A whereby it is also urged downwardly by fluid pressure thereabove, as will be described. Piston 30B is urged upwardly to move the downstream gate upwardly by means of a coil spring 51B compressed between the wall 26A of the valve body and a ring 52 disposed between the upper end of the coil spring and rods 53 which connect to the piston 30B. More particularly, the coil spring 51A is disposed concentrically within the coil spring 51B, and the rods 53 extend downwardly through the lower end of the piston 30A.

The cylinder 27 has a head 55b across its upper end with a port 55a through which fluid under pressure may be supplied to or exhausted from the chamber 55 formed between the head and the upper ends of the pistons 30A and 30B. More particularly, the lower end of the chamber is closed by means of the seal rings 50A and 50B carried by the pistons, whereby, as previously described, fluid pressure within the chamber 55 is effective to urge each of the pistons downwardly to move the gates to which they are connected toward open positions.

The rod 31A connecting piston 30A to the upstream gate 28A is sealably slidable within a seal ring 56 about an opening through the upper wall 26A of the bonnet to which the cylinder is connected. More particularly, the rod 31A is hollow so as to closely receive the rod 31B therethrough for sealed reciprocation with respect to one another during opening and closing movement of the gates.

As shown in FIG. 9, the connector 32A for connecting the lower end of the rod 31A to the upstream gate 28A comprises a body having a cylindrical upper end 54 which is interiorly threaded for connection to the lower end of the rod 31A and a substantially semi-cylindrical lower end 56 having a tee 57 at its lower end for releasably fitting within a T-slot 58 in the upper end of gate 28A. The lower semi-cylindrical end 56 of the connector 32A has an inner cylindrical surface 59 to receive the upper cylindrical end 60 of the connector 32B, as shown in FIGS. 1-4. The inner face of the lower end 56 of the connector is flat to permit it to move past the inner flat face of the lower end 62 of the connector 32B.

The upper cylindrical end 60 of connector 32B is interiorly threaded for connection to the lower threaded end of the rod 31B and is adapted to fit within the inner diameter of the upper end 54 of the connector 32A. The lower end 62 of the connector 32B has a substantially semi-cylindrical shape whose outer arcuate surface is generally aligned with the cylindrical surface of the upper end 54 of the connector 32A. Thus, both connectors move freely within the cylindrical interior of the bonnet, and, as above noted, the inner face of the lower end 62 of connector 32B is flat to permit its movement past the oppositely facing flat face of the connector 32A during relative reciprocation between them. A tee 63 at the lower end of the connector 32B is adapted to fit removably within a T-slot 64 in the upper end of the gate 28B.

Figure 10:
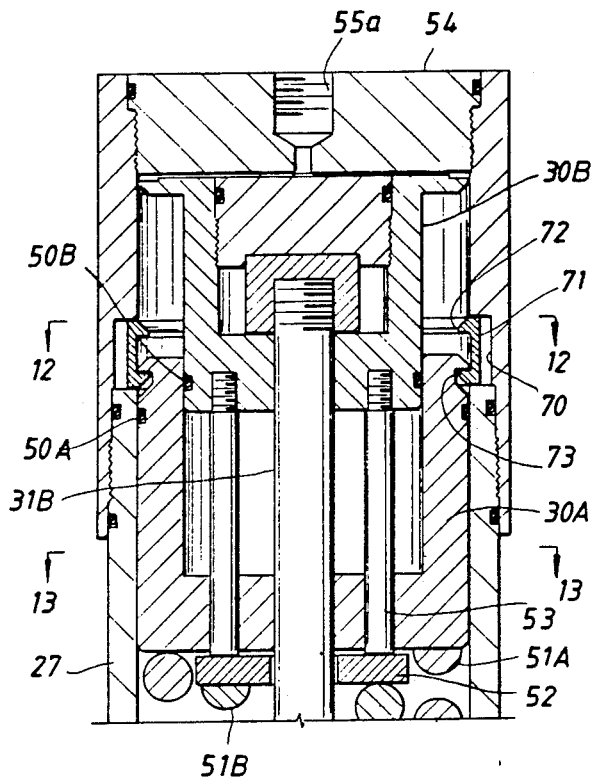
FIG. 10 is an enlarged cross-sectional view of the upper end of the actuator with the pistons in their positions within the cylinder shown as in FIG. 1.

The cylinder of the actuator has a groove 70 formed therebout near its upper end to receive an expandable and contractible split locking ring 71 which, when relaxed, occupies the inner position best shown in FIG. 10 with its outer side is spaced from the inner side of the recess 70 and lips 72 and 73 at its upper and lower ends projecting into the cylinder. The upper end of the piston 30A has a tapered surface adapted to slide over the lower tapered end of the lip 73 of the ring 71 in order to permit a groove 74 thereabout to fit over the lip of piston 30A as it moves upwardly. On the other hand, the enlarged upper diameter of piston 30B has a tapered surface for sliding over the tapered upper end of the lip 72 so as to permit it to move past and beneath the lip 72 as piston 30B moves downwardly.

In the closed position of the valve shown in FIG. 1, fluid pressure in the chamber 55 above the pistons has, of course, been exhausted to permit both of the coil springs 51A and 51B to expand to raise the pistons to their uppermost positions. At this time, a shoulder 75 about the rod 31A is engaged with a back seat 76 about the lower end of the opening in the top wall of the bonnet so as to locate the upstream gate in its closed position in which the solid lower end thereof is disposed across the port in the downstream seat ring. At this time, the downstream gate is also located in its closed position, as shown in FIG. 1, by engagement of the upper end 77 of the connector 32B with a seat 78 on the lower end of the outer rod 31A. At this stage, the lower lip 73 of the locking ring is disposed within the groove 74 about piston 30B to hold it against downward movement.

Figure 11:
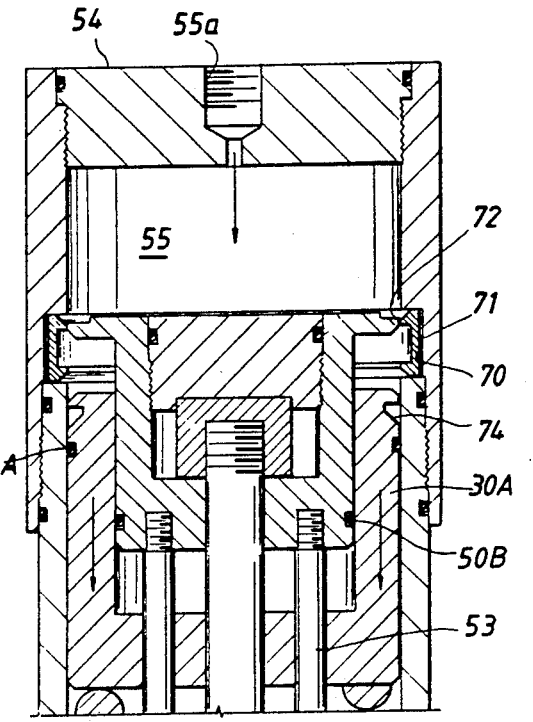
FIG. 11 is a view similar to FIG. 10, but upon lowering of the piston connected to the upstream gate to a position beneath that shown in FIG. 2, and with the expandable and contractible holding ring released to permit the piston connected to the downstream gate to move downwardly, as shown by the arrow in FIG. 11.
Figure 12:
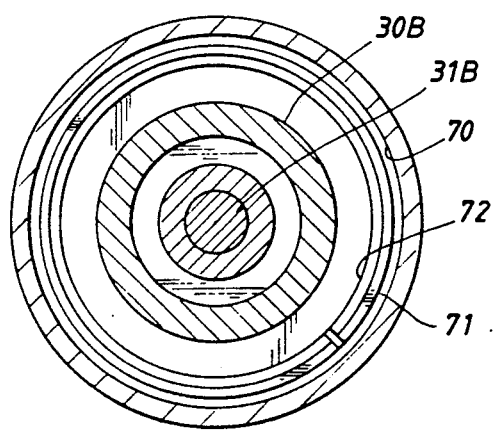
FIG. 12 is a cross-sectional view of the actuator, as seen along broken lines 12—12 of FIG. 10.
Figure 13:
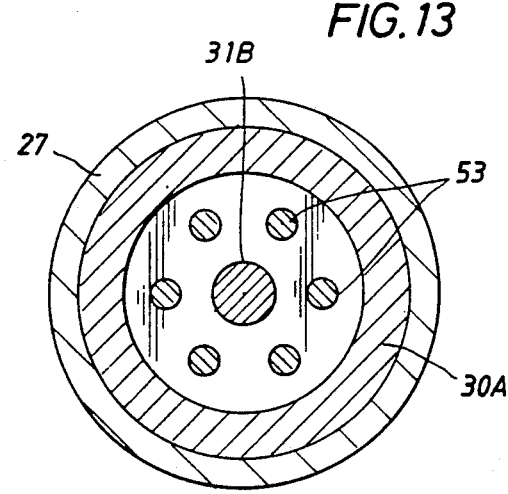
FIG. 13 is a cross-sectional view of the actuator, as seen along broken lines 13—13 of FIG. 10.

As fluid pressure is supplied to the chamber 55, the piston 30B is initially moved downwardly, while the piston 30A is held against downward movement, to compress the coil spring 51B and move the downstream gate 28B downwardly toward its open position. As shown in FIG. 2, as the piston 30B nears its lowermost position, its upper end engages the upper lip 72 of the locking ring to move it outwardly to its expanded position, so that, as best shown in FIG. 11, the lower lip 73 of the locking ring is removed from the groove 74 to release the piston 30A for movement downwardly to compress spring 51A in order to move the upstream gate 28A toward its open position, as shown in FIG. 3. Thus, as will be understood from a comparison of FIGS. 11 and 3, the piston 30B continues to move downwardly to move the downstream gate 28B to its fully open position in which it engages the lower end of the cavity, and the piston 30A continues to be moved downwardly until the lower end of upstream gate 28A engages the lower end of the cavity, thus bringing the port in the gate 28A into alignment with the port in the gate 28B as well as the flowway 23 on opposite sides of the body cavity to open the valve itself.

The valve is automatically caused to "fail-safe close" or move back toward closed position upon the loss of fluid pressure from the chamber 55. Thus, as can be seen from a comparison of FIGS. 3 and 4, the loss of such fluid permits the outer coil spring 51A to expand and thus move the piston 30A upwardly in order to raise the gate 28A to its upper position wherein the solid portion of the gate is disposed across the inner end of the port in the upstream seat ring to close it. As the upstream gate approaches its uppermost position, in which the surface 75 engages the seat 76, the upper tapered end of the piston 30A engages the lower lip 73 to expand the locking ring, so that, upon continued upward movement of the piston, the locking ring releases the piston 30B so that it may be raised by expansion of coil spring 51B. At this time, of course, the piston 30A has moved upwardly to a position in which the lower lip 73 of the locking ring springs inwardly into groove 74 to hold the piston 30A and thus the upstream gate against downward movement until the valve is returned to its open position by the supply of pressure fluid to chamber 55.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A gate valve comprising
   a valve body having a flowway therethrough, and a cavity therein intersecting the flowway,
   first and second gates each having a port therethrough and mounted in side by side relation within the valve body cavity for relative reciprocation between open position in which the port is aligned with the flowway and closed position in which a solid portion of the gate is aligned with the flowway,
   an actuator for so moving the gates including means for moving the first gate from closed to open position automatically in response to movement of the second gate from closed to open position and for moving the second gate from open to closed position automatically in response to movement of the first gate from open to closed position.

2. A gate valve of the character defined in claim 1, wherein said actuator comprises
   a cylinder,
   first and second pistons reciprocable within the cylinder and connected to the first and second gates, respectively,
   means for moving each of said pistons in opposite direction in order to move the gate connected thereto between open and closed positions, and
   means holding the first piston against movement in a direction to move the first gate from closed to open position until the second piston has been moved in a direction to move the second gate from closed to open position and holding the second piston against movement in a direction to move the second gate from open to closed position until the first piston has been moved in a direction to move this first gate from open to closed position.

3. A gate valve of the character defined in claim 2, wherein said piston moving means includes
   means by which fluid under pressure may be supplied to the cylinder on one side of the pistons to move them in one direction, and
   first and second spring means urging each of said first and second gates respectively in the other direction.

4. A gate valve of the character defined in claim 3, wherein
   the pistons and springs are arranged concentrically of one another, and
   the pistons are connected to their respective gates by concentric rods which extend sealably out of the cylinder into the valve body.

5. A gate valve of the character defined in claim 4, wherein
   the first piston is sealably slidable within the cylinder and the second piston is sealably slidable within the first piston, and
   the holding means includes an expandable and contractible locking ring mounted in the cylinder to hold the first piston as the second piston moves in gate closing direction and engageable by the second piston to release the first piston as the second piston reaches the end of the gate closing movement, and hold the second piston as the first piston moves in gate opening direction gate and engagable by the first piston to release the second piston as the first piston reaches the end of the gate opening movement.

6. A gate valve of the character define in claim 1, including
   first and second seat rings sealably slidable in the valve body for engaging the outer sides of the first and second gates, respectively, and
   spring means yieldably urging the ends of the seat rings and the outer sides of the gates toward one another.

7. A gate valve of the character defined in claim 6, including
   means mounted in the valve body for guiding the gates as they move between open and closed positions, including
   a guide frame having an inner wall extending between the gates and having a port therethrough adapted to be aligned with the ports in the gates in their open positions, and
   an outer wall closely surrounding the second seat ring and bearing against the body cavity on the outer side of the second gate so as to transmit the load on the first gate due to line fluid upstream thereof directly to the valve body.

8. A gate valve of the character defined in claim 6, wherein
   the spring means includes springs compressed between opposite sides of the inner wall of the guide frame and the inner sides of the gates to urge the gates outwardly against the ends of the seat rings.

9. A gate valve of the character defined in claim 1, wherein said actuator includes,
   means for holding the first gate against movement from closed to open position,
   means for releasing said holding means to permit the first gate to move from closed to open position automatically in response to movement of the second gate from closed to open position,
   means for holding the second gate against movement from open to closed position, and
   means for releasing said last mentioned holding means to permit the second gate to move from open to closed position automatically in response to movement of the first gate from open to closed position.

10. A gate valve of the character defined in claim 9, wherein
    said actuator includes first and second reciprocating members connected to the first and second gates, respectively, and
    means for moving the members in opposite directions in order to move the gate connected thereto between open and closed positions,
    said first mentioned holding means is engageable by the first member for so holding the first gate and releasable in response to engagement by the second member, and
    said second mentioned holding means is engageable by the second member for so holding the second gate and releasable in response to engagement by the first member.

11. A gate valve of the character defined in claim 10, including
    power means for moving each of the reciprocating members in one direction, and
    spring means for moving each of the reciprocating members in the other direction upon loss of the supply of power to the power means.

* * * * *